United States Patent
Borchers

(10) Patent No.: US 7,376,666 B2
(45) Date of Patent: May 20, 2008

(54) DRIVER DATABASE AUTO-CONFIGURATION METHODS AND MEANS

(75) Inventor: Gregory Eugene Borchers, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 391 days.

(21) Appl. No.: 10/804,653

(22) Filed: Mar. 19, 2004

(65) Prior Publication Data
US 2005/0210060 A1 Sep. 22, 2005

(51) Int. Cl.
*G06F 17/30* (2006.01)

(52) U.S. Cl. .................. 707/102; 707/104.1; 358/1.14; 358/1.15

(58) Field of Classification Search .............. 707/1–2, 707/100, 102, 104.1; 719/321–322; 358/1.14, 358/1.15
See application file for complete search history.

(56) References Cited

U.S. PATENT DOCUMENTS

| | | | |
|---|---|---|---|
| 5,580,177 A * | 12/1996 | Gase et al. .................. 400/61 |
| 6,607,314 B1 | 8/2003 | McCannon et al. | |
| 7,168,003 B2 * | 1/2007 | Lozano et al. ................ 714/25 |
| 7,304,758 B2 * | 12/2007 | Ferlitsch .................... 358/1.15 |
| 7,308,440 B2 * | 12/2007 | Rajarajan et al. ............... 707/3 |
| 2003/0041238 A1 * | 2/2003 | French et al. ................ 713/153 |
| 2003/0065755 A1 | 4/2003 | Gunji | |
| 2003/0065773 A1 * | 4/2003 | Aiba et al. ................... 709/224 |
| 2003/0088651 A1 * | 5/2003 | Wilson, Jr. ................... 709/221 |
| 2003/0093433 A1 * | 5/2003 | Seaman et al. ............. 707/102 |
| 2003/0120593 A1 * | 6/2003 | Bansal et al. ................. 705/39 |
| 2003/0169444 A1 | 9/2003 | Kemp et al. | |
| 2003/0234950 A1 * | 12/2003 | Lay ........................... 358/1.14 |
| 2004/0215754 A1 * | 10/2004 | Orleth et al. ............... 709/223 |
| 2005/0068558 A1 * | 3/2005 | Wang et al. ................. 358/1.13 |
| 2005/0105129 A1 * | 5/2005 | Takahashi ................... 358/1.15 |
| 2006/0072140 A1 * | 4/2006 | Mitani ........................ 358/1.13 |
| 2007/0005736 A1 * | 1/2007 | Hansen et al. .............. 709/220 |

FOREIGN PATENT DOCUMENTS

| | | |
|---|---|---|
| JP | 2003241925 | 8/2003 |
| JP | 2004078744 | 3/2004 |

* cited by examiner

*Primary Examiner*—Wilson Lee
*Assistant Examiner*—Hanh B Thai
(74) *Attorney, Agent, or Firm*—Madson & Austin

(57) ABSTRACT

A method and system of administering an MFP connected to a network comprising discovering an MFP; building an MFP database comprising data regarding the MFP discovered; discovering a driver; building a driver database comprising data identifying at least one MFP the driver is applicable to; and building a relationship database comprising an associated MFP/driver record for each allowable combination is provided.

17 Claims, 5 Drawing Sheets

DRIVER DATABASE AUTO-CONFIGURATION METHODS AND MEANS

BACKGROUND OF THE INVENTION

This invention relates to managing multi-function peripherals (MFPs) and drivers in a networked environment.

Currently when a new MFP or driver is added to a network, a user, or administrator, manually associates MFPs with one, or more, drivers. For example, in a Microsoft® Windows® network environment, printer drivers are manually associated with a print queue that has been manually assigned to a printer. In an environment without a print server, each driver is manually assigned to an MFP As the number of MFPs and drivers increases in larger organizations, the manual management of the association of MFPs, with drivers can become time consuming. This problem may be further complicated when updated drivers are released. These updated drivers may then need to be associated with multiple MFPs, possibly even multiple different models of MFPs.

DETAILED DESCRIPTION OF THE INVENTION

Embodiments of the present invention provide a process by which MFPs and their drivers are discovered and automatically associated with each other using a relational database with many-to-many relationship structure.

Figure 1:
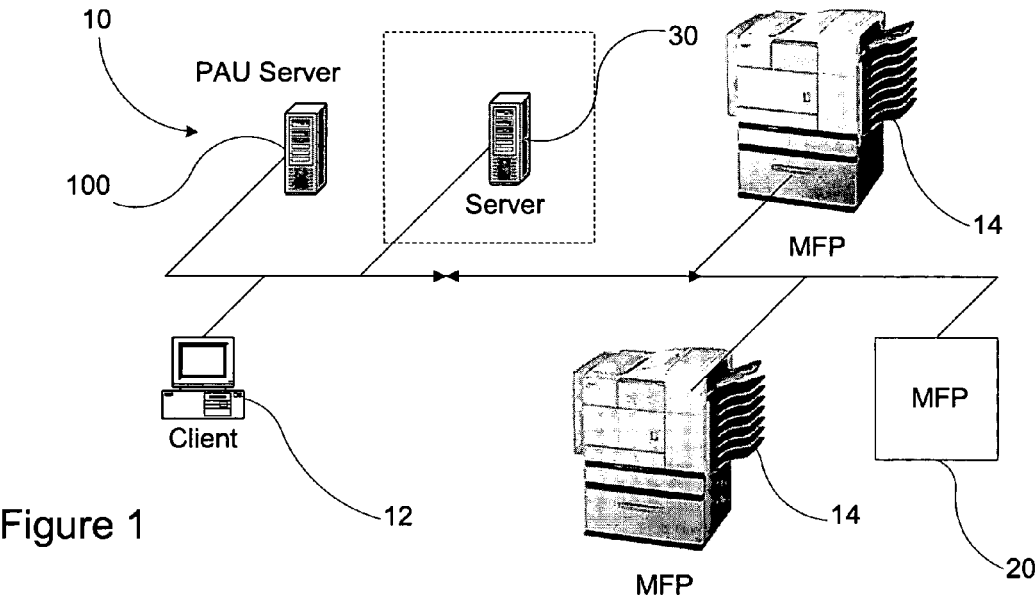
FIG. 1 is a diagram of MFPs connected to a network.

FIG. 1 shows a network 10 with multiple MFPs connected to the network, along with servers and clients. A client 12 may access MFPs 14, or a virtual MFP 20. The client 12 may also access a server 30, which may be a Windows® server, a Novell® sever, a Unix® server, or a Linux® server, for example. The server 30 is included for illustration purposes and is not required. The network 10 has a PAU server 100. It is possible that the PAU server 100 is incorporated into the server 30, but it is also possible to maintain the PAU server 100 as a separate server on the Network 10. Many other clients, servers, or devices that are not shown may be connected to the network 10, as is well understood in the art.

The term MFP stands for Multi-Function Peripheral (sometimes multi-function printer, or multi-function product). The term MFP as used herein refers to printers, copiers, scanners, and fax machines or peripherals that have one or more of these functions. The term MFP will be used herein to refer to these peripherals as well as software that simulate these functions, which may be referred to as virtual MFPs. Examples of Virtual MFPs are programs such as Adobe® PDF Writer, Adobe® PDF Distiller, Sharpdesk® Composer, or desktop fax applications that may be treated as MFPs. Virtual MFPs tend to be applications that substitute an electronic format for a printed output. Virtual MFPs are origins or endpoints in a document workflow, just as non-virtual MFPs are.

The client 12 is any computing device capable of being connected to the network, either directly, or indirectly through another computing device. So the client 12 may be a personal computer, workstation, minicomputer, mainframe, supercomputer, personal digital assistants (PDAs), smart telephone, for example a picture phone, or any other suitable computing device.

The network 10 could be a local area network, a wide area network, or any other form of network allowing a client 12 to connect to a peripheral anywhere else on the network. The network 10 may include a global communications network, so long as the client 10 can access a peripheral connected to the network. The client 12 is connected to an MFP using either a wired connection, or a wireless connection.

Figure 2:
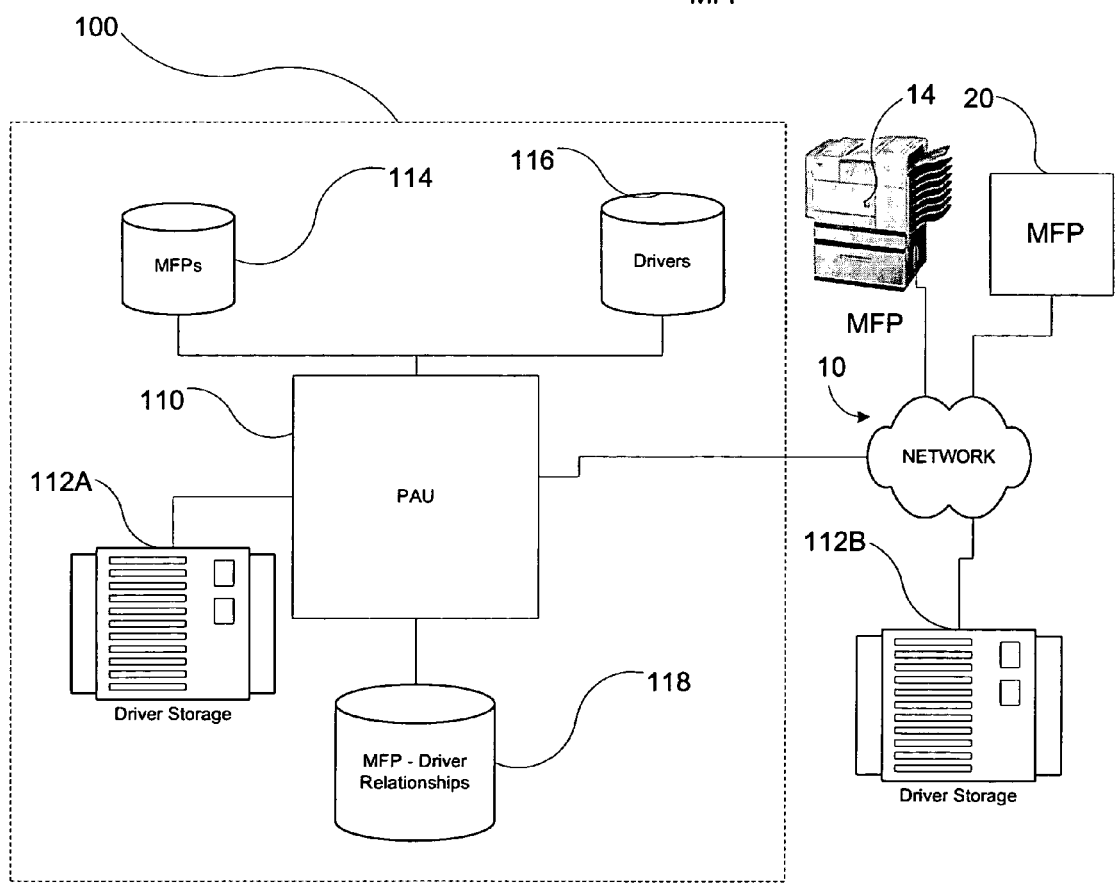
FIG. 2 is a diagram of an administration utility.

FIG. 2 illustrates aspects of an embodiment of a Printer Administration Utility (PAU) 110. The PAU 110 is a utility designed to assist in printer management. The PAU comprises software routines contained in software adapted to run on a general purpose computer, or embedded into hardware. The PAU may be part of the primary network server, part of a separate server, or even part of an MFP with sufficient server capability, connected to a network. In one embodiment the PAU 110 is implemented on a web server, using a web interface. In another embodiment, an MFP having server capability, for example a web server, contains the PAU. The PAU 110 is connected to a driver repository. The driver repository may be associated with the server containing the PAU 110, for example local driver repository 112A is shown as being logically contained on the same PAU server 100 as the PAU. Alternatively, a remote driver repository 112B is shown as being connected to the PAU through a network 10. The driver repository 112B may be located on the local network, a wide area network, or a global network, for example the Internet.

The PAU 110 is capable of discovering MFPs located on the network and creating an MFP database 114. The PAU is capable of discovering drivers located on either a local driver repository 112A or a remote driver repository 112B. Either driver repository could be a implemented using a compact disk, a DVD, a floppy, a memory card, a media jukebox, a hard drive, or any other suitable data storage medium. Once the drivers are discovered, the PAU is capable of building a driver database 116. Once the driver database 116 and the MFP database 114 have been built, the PAU creates a many-to-many relationship to associate drivers with compatible MFPs and builds an MFP/driver relationships database 118.

Figure 3:
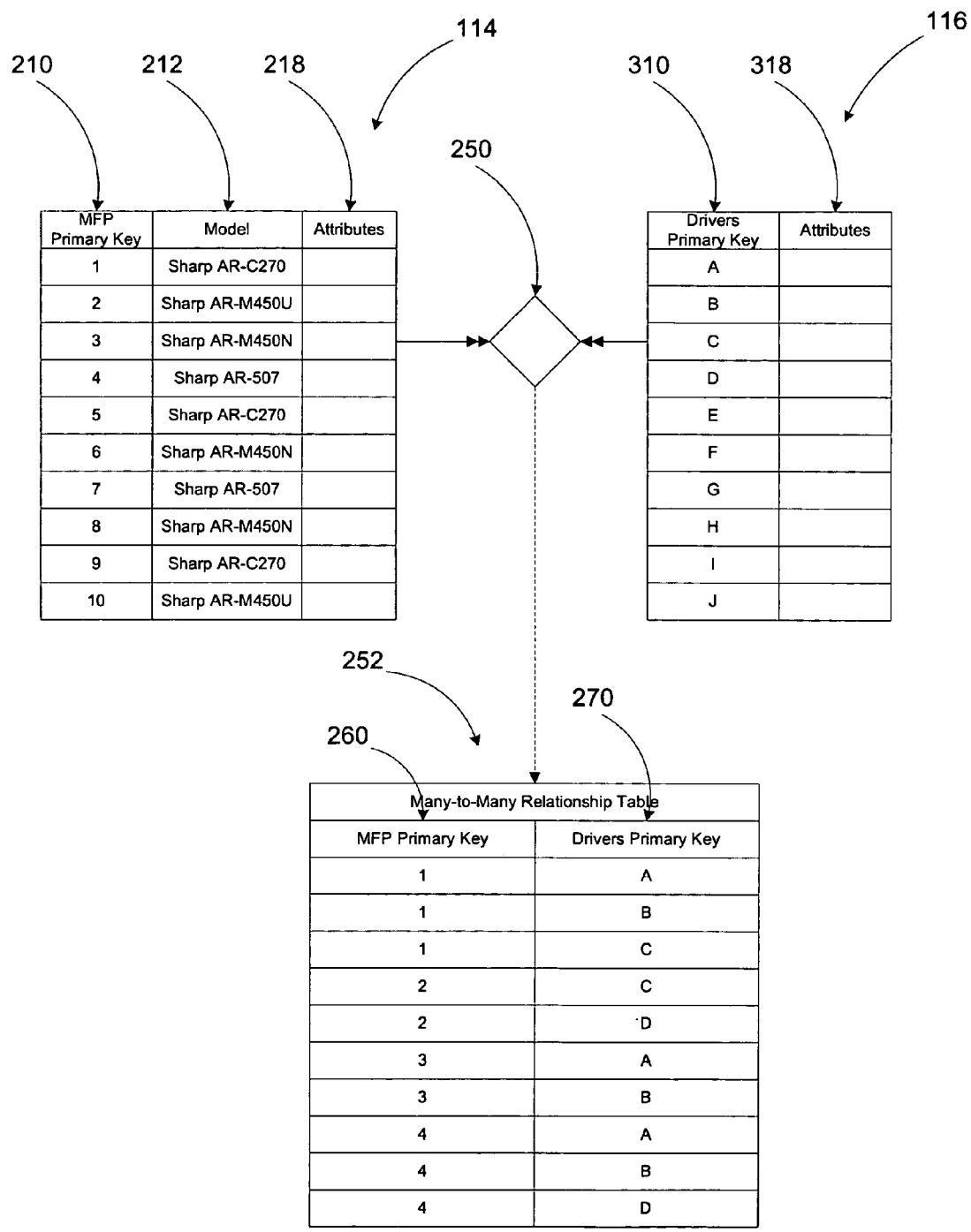
FIG. 3 is a diagram of a database.

FIG. 3 illustrates the data relationships employed by the PAU. An MFP database 114 is built having an MFP primary key 210 that is unique to each MFP connected to the network. For purposes of illustration only, they are shown as being numbers. The primary key can be any piece of data capable of uniquely identifying the MFP. For example, the primary key could be the MAC address of the MFP, or the MAC address plus the IP address of the MFP. The MFP database also contains attributes. The attributes include a field 212 that refers to the model of each MFP, as well as any number of other attributes indicated generally by attributes 218. In the example shown in FIG. 3, the model name is used to identify each model. Other model identifiers may be used for example model numbers, serial numbers, or portions of serial numbers.

The driver database 116 has a primary key 310 along with many attributes identified generally at 318. For purposes of illustration only, the driver primary key is indicated by letters. In an embodiment of the present process, the driver primary key is a unique value generated by the PAU. In another embodiment of the present process, the driver primary key is based, at least in part, on the OS/PDL/Version, which will typically uniquely identify a driver. The relationship between the driver database 116 and the MFP database 114 is a many-to-many relationship, as indicated at 250. The many-to-many relationship many be represented by a foreign key table 252, which provides a relationship between an MFP primary key 260 and a driver primary key 270.

The driver database 116 is built by parsing XML metadata associated with the discovered drivers. An outline of the XML metadata structure is provided in the following example:

XML Metadata Example

```
<?xml version="1.0" encoding="UTF-8" ?>
<CDLAYOUT>
<! -- List all models supported-->
    <FAMILY>
       <MODELLIST>
           <MODEL>SHARP AR-M160</MODEL>
           <MODEL>SHARP AR-M205</MODEL>
           <MODEL>SHARP AR-5220</MODEL>
       </MODELLIST>
       <FAMILYNAME>SHARP-13</FAMILYNAME>
    <! -- List all languages supported-->
    <LANGUAGE>
        <LANGNAME>DANISH</LANGNAME>
    <! -- List all operating systems supported-->
    <OS>
        <OSNAME>WIN2K</OSNAME>
        <! -- List all PDLs supported-->
            <PDL>
              <PDLNAME>PCL6</PDLNAME>
            <! - relative path of the driver files for the
               Danish/Win2K/PCL6-->
               <PATH>/Drivers/Printer/Danish/PCL6/2kxp/</
               PATH>
            <! - inf fileName of the driver files for the
               Danish/Win2K/PCL6-->
               <INFFILENAME>SE2EJDAN.INF</INFFILENAME>
            <! - version of the driver files for the
               Danish/Win2K/PCL6-->
               <VERSION>01.00.00.00</VERSION>
            <! - version of the driver files for the
               Danish/Win2K/PCL6-->
<! - Note: "MODEL" will be replaced with the MODEL NAME of the
MFP when building the driver database-->
                <DRIVERNAME>MODEL
                PCL6</DRIVERNAME>
                <DRIVERDESC>SHARP PCL6 Printer
                Driver Disk</DRIVERDESC>
                <MODULE_UPDATES />
            </PDL>
            <PDL>
              <PDLNAME>PS</PDLNAME>
                <PATH>/Drivers/Printer/Danish/PS/
                2kxp/</PATH>
                <INFFILENAME>se2HJDAN.INF</INF
                FILENAME>
                <VERSION>01.00.00.00</VERSION>
                <DRIVERNAME>MODEL
                PS</DRIVERNAME>
                <DRIVERDESC>SHARP PS Printer
                Driver Disk</DRIVERDESC>
                <MODULE_UPDATES />
            </PDL>
        </OS>
        <OS>
          <OSNAME>WINXP</OSNAME>
            <PDL>
              <PDLNAME>PCL5e</PDLNAME>
                <PATH>/Drivers/Printer/Danish/PCL5e/
                2kxp/</PATH>
                <INFFILENAME>SE2DJDAN.INF</INF
                FILENAME>
                <VERSION>01.00.00.00</VERSION>
```

-continued

```
                <DRIVERNAME>MODEL
                PCL5e</DRIVERNAME>
                <DRIVERDESC>SHARP PCL5e Printer
                Driver Disk</DRIVERDESC>
                <MODULE_UPDATES />
            </PDL>
            <PDL>
              <PDLNAME>PS</PDLNAME>
                <PATH>/Drivers/Printer/Danish/PS/
                2kxp/</PATH>
                <INFFILENAME>se2HJDAN.INF</INF
                FILENAME>
                <VERSION>01.00.00.00</VERSION>
                <DRIVERNAME>MODEL
                PS</DRIVERNAME>
                <DRIVERDESC>SHARP PS Printer
                Driver Disk</DRIVERDESC>
                <MODULE_UPDATES />
            </PDL>
        </OS>
    </LANGUAGE>
    </FAMILY>
</CDLAYOUT>
```

In the XML Metadata Example the XML starts with a driver root. For example, the driver root is indicated above by <CDLAYOUT>. Within the driver root, the family of MFPs is identified. Each family includes a list of models within a specific product family and a family name. Nested within each family is at least one language section identifying human languages, for example English, Japanese, Czech, etc. Nested with each language section is at least one operating system (OS) section. The OS section identifies machine operating systems, for example Microsoft® Windows®, Unix®, Linux®, Mac® OS X, or other operating system. Nested within the OS section is at least one page description language (PDL) section. The PDL section relates to a page description language, for example PCL5, PCL6, Postscript, DVI, PDF, Sharpdesk Composer format, a suitable fax format, or other suitable driver format. The PDL section contains many of the key attributes of each driver. Although a specific sequence of nesting was provided in the above example, family/language/OS/PDL, the present process is not limited to this sequence, for example family/OS/language/PDL could be used.

Referring again to FIG. 3, the many-to-many relationship is formed in the foreign key database 252, by parsing the XML data and identifying models that are compatible with each driver. Each MFP model may have a different driver for each language, each OS, and each PDL. Assuming for illustration, that 17 languages are supported for example in a large multinational organization, along with 3 operating systems, and 3 PDLs, each MFP could be associated with 153 different drivers. When this is further complicated in an environment supporting multiple MFP models, the difficulty of manually managing drivers and their relationships to individual MFPs becomes apparent. Also each driver may be associated with multiple MFPs. In some organizations, the difficulty of providing all of the possible drivers requires the administrator to restrict the drivers available to any given user. This is not always desirable.

Figure 4:
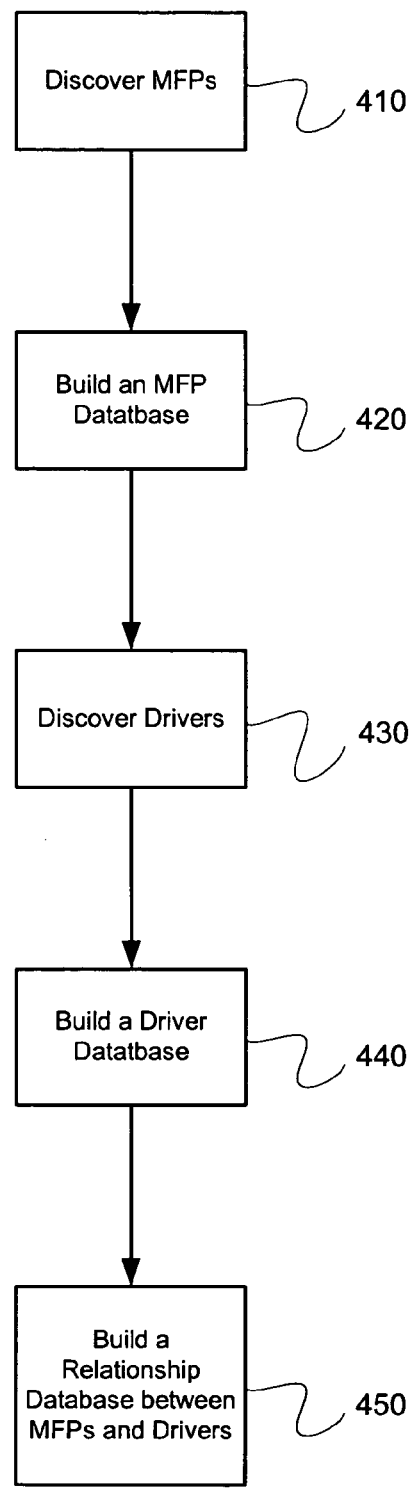
FIG. 4 is a process flow diagram.

FIG. 4 illustrates the basic steps of an embodiment of the current process. In step 410 MFPs are discovered. The discovery of MFPs is only limited by the connectivity of the PAU and the network. In an embodiment of the present process, Simple Network Management Protocol (SNMP) is used to discover the MFPs connected to the network.

In step 420, the PAU builds an MFP database. In an embodiment of the present process, SNMP Standard Printer Management Information Base (MIB) data is used to build the MFP database.

In step 430, the PAU discovers printer drivers. The printer drivers may be located on any driver repository, as discussed above. Location of drivers discovered is limited only by the connectivity of the PAU.

In step 440, the PAU builds a driver database. In an embodiment of the present process, XML metadata associated with each of the discovered drivers is parsed to establish the attributes of each driver discovered and build the driver database.

In step 450, the PAU analyzes the MFP database and the driver database to create a many-to-many relationship for each allowable MFP/driver combination. In an embodiment of the present process, the MFP/driver relationship is built using a relational database with a many-to-many relationship. In an embodiment of the present process, the driver database contains information on all models of MFP for which a driver is suitable. This model information is then used to associate each driver with all allowable MFPs, whereby allowable combinations are formed.

Figure 5:
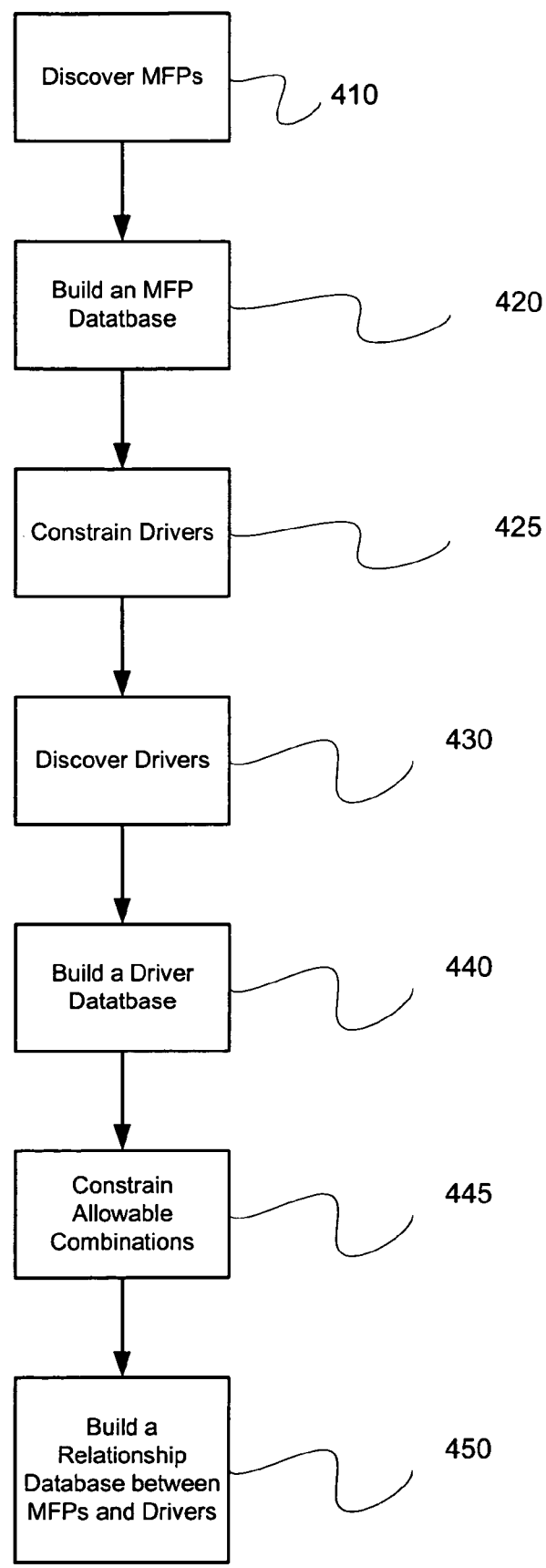
FIG. 5 is a process flow diagram.

FIG. 5 illustrates another embodiment of the present process. For some installations, it may be desirable to reduce the available drivers. As shown in step 425, the drivers are constrained prior to discovery. The drivers may be constrained by language, OS, Model, PDL, or revision version, for example. In step 430, only those drivers satisfying the constraints will be discovered.

In another embodiment, allowable combinations are constrained at step 445. Even after the driver database has been built, it may be desirable to constrain the allowable combinations. The MFP/driver relationships may be constrained by language, OS, Model, PDL, or revision version, for example. The constraints at step 445, are able to further constrain the driver database, but are still constrained by the constraints established in step 425. Accordingly, in some embodiments it may be desirable not to constrain the drivers and implement the constraints at step 445 prior to building the relationship database at step 450. The constraints can be implemented separately, or in combination.

Figure 6:
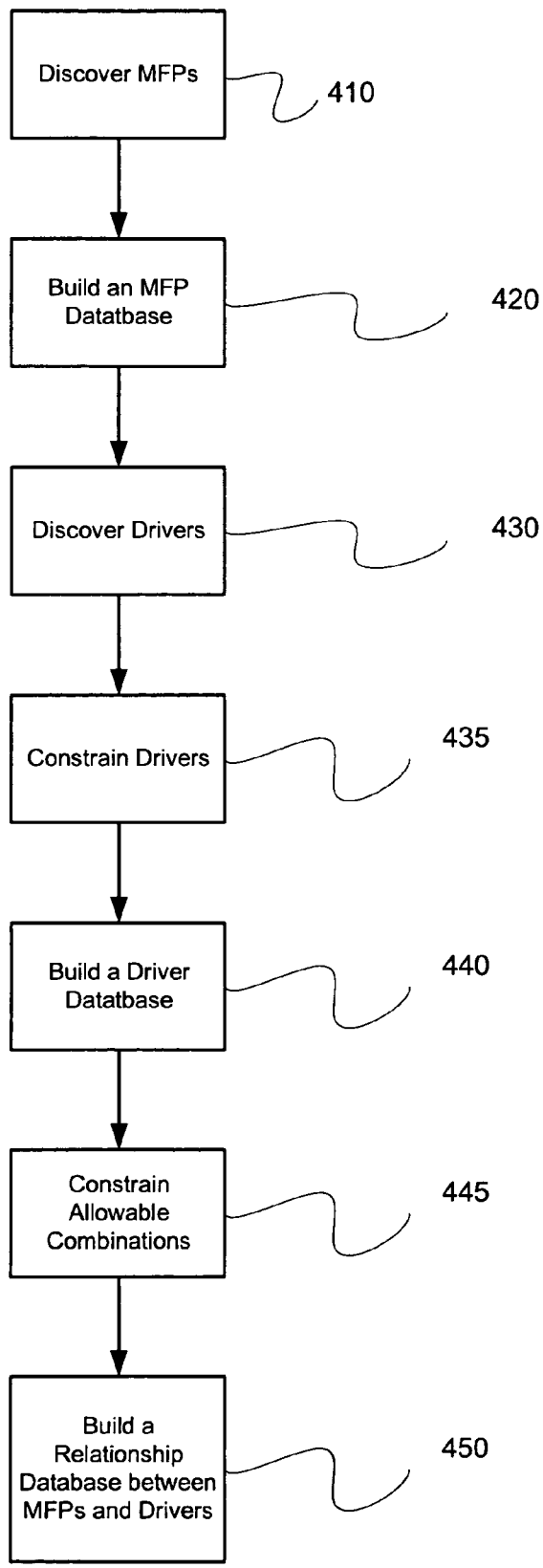
FIG. 6 is a process flow diagram.

FIG. 6 illustrates another embodiment of the present process. For some installations, it may be desirable to reduce the available drivers. As shown in step 435, the drivers are constrained after discovery, but prior to building the driver database. The drivers may be constrained by language, OS, Model, PDL, or revision version, for example. In step 440, only those drivers satisfying the constraints will be included in the driver database. As discussed above, it is possible to further constrain the MFP/driver relationships as indicated by step 445. The constraints can be implemented separately, or in combination.

When MFPs or drivers are deleted, the PAU maintains referential integrity by performing cascading deletes. Although the various embodiments of the present process provide a means to automate the discovery, and association, of drivers with MFPs to reduce, or eliminate, the need for manual administration of these resource, additions, modification, or deletions may be made manually in some embodiments. This may allow drivers or MFPs to be administered even if they are not capable of being automatically discovered, or they lack the necessary data to parse and build a record within either the MFP database or the driver database. In some embodiments, the PAU is still able to build the MFP/driver relationship database even if the individual MFPs or drivers were entered manually.

Note, that throughout this description, and the associated claims, we have indicated that the MFPs are discovered, and the MFP database is built before the drivers are discovered. While this may be preferred in some embodiments, it is entirely possible to discover drivers and build the driver database prior to discovering MFPs. Likewise the MFPs could be discovered and the drivers discovered prior to building the MFP database or the driver database. It may also be desirable to discover MFPs and drivers in parallel and build the databases simultaneously.

The term computer readable medium as used in the claim refers to any physical medium used to store a software routine, this includes being embedded in firmware, and any communications medium by which a software routine may be communicated, including wired and wireless network connections and their signals.

Although a preferred embodiment, and other embodiments have been discussed above, the coverage is not limited to these specific embodiments. Rather, the claims shall determine the scope of the invention. The sequence of elements alone shall not be limiting as steps may be performed in different sequences and still be within the scope of the present process and its associated claims.

What is claimed is:

1. A method of associating drivers and Multi-Functional Peripherals (MFPs) connected to a network comprising discovering MFPs by a printer administration utility; building an MFP database comprising data regarding the MFP discovered by the printer administration utility; automatically discovering printer drivers by the printer administration utility, wherein the automatic discovering of printer drivers includes the discovery of updated drivers; automatically building, by the printer administration utility, a printer driver database comprising data identifying at least one MFP each printer driver is applicable to; automatically analyzing the MFP database and the driver database by the printer administration utility to determine allowable MFP/printer driver combinations; and automatically building a relationship database by the printer administration utility; wherein an allowable MFP/printer driver combination is a printer driver and at least one compatible MFP; and whereby the addition of either a new driver or a new MFP and automatic association is accomplished without manual administration by a user.

2. The method of claim 1, wherein discovering MFPs comprises using Simple Network Management Protocol (SNMP) to locate and identify an MFP.

3. The method of claim 1, wherein building an MFP database comprises parsing standard printer Management Information Base (MIB) data.

4. The method of claim 1, wherein discovering printer drivers comprises locating a printer driver file comprising metadata within a printer driver repository.

5. The method of claim 4, wherein the metadata is Extensible Markup Language (XML) metadata.

6. The method of claim 4, wherein the metadata identifies each MFP capable of being associated with each printer driver.

7. The method of claim 6, wherein building the printer driver database comprises parsing the metadata.

8. The method of claim 7, wherein building a relationship database comprises creating a relational database with a many-to-many relationship linking a primary key of the MFP database with a primary key of the printer driver database for each allowable combination of MFP/printer driver relationships based upon MFP model and printer driver model compatibility.

9. The method of claim 1, further comprising constraining the printer drivers prior to discovering the printer drivers.

10. The method of claim 1, further comprising constraining the printer driver after discovering the printer drivers, and prior to building the printer driver database.

11. The method of claim 1, further comprising constraining the associated MFP/printer driver combinations prior to building the relationship database.

12. A method of associating drivers and Multi-Functional Peripherals (MFPs) comprising automatically discovering and building an MFP database using Simple Network Management Protocol (SNMP) Standard Printer Management Information Base (MIB) data for each MFP; automatically discovering printer drivers located on a network by a printer administration utility, wherein the automatic discovering of printer drivers includes the discovery of updated drivers; parsing Extensible Markup Language (XML) data associated with each printer driver to build a printer driver database; and joining the MFP database and the printer driver database in a many-to-many relationship using the XML metadata for each printer driver to automatically identify compatible MFPs for each printer driver to produce an associated MFP/printer driver record for each allowable combination; wherein an allowable combination is a printer driver and at least one compatible MFP; and whereby the addition of either a new driver or a new MFP and automatic association is accomplished without manual administration by a user.

13. The method of claim 12, further comprising constraining printer drivers prior to discovering printer drivers located on the network.

14. The method of claim 12, further comprising constraining printer drivers after discovering printer drivers and prior to building the printer driver database.

15. The method of claim 12, further comprising constraining allowable combinations of associated MFP/printer driver records prior to joining the MFP database and the printer driver database in a many-to-many relationship.

16. A system for associating available Multi-Functional Peripherals (MFPs) with available printer drivers comprising a general purpose computer means for processing data, wherein the computer processor means is adapted to connect to a network; a first means for automatically discovering MFPs connected to the network by a printer administration utility; a second means for building an MFP database comprising MFP data; a third means for automatically discovering printer drivers; a fourth means for automatically building a printer driver database by the printer administration utility; and a fifth means for joining the MFP database with the printer driver database in a many-to-many relationship to identify an allowable combination of a printer driver and an MFP; wherein an allowable combination is a printer driver and a compatible MFP; and whereby the addition of either a new driver or a new MFP and automatic association is accomplished without manual administration by a user.

17. A computer readable medium encoded with a computer program for associating a Multi-Functional Peripheral (MFP) with a printer driver comprising a first software routine for automatically discovering an MFP; a second software routine for building an MFP database comprising data regarding the MFP discovered; a third software routine for automatically discovering a printer driver, wherein the automatic discovering of the printer driver includes the discovery of an updated driver; a fourth software routine for automatically building a printer driver database comprising data identifying at least one MFP the printer driver is applicable to; and a fifth software routine for automatically building a relationship database; wherein the relationship database further comprises a first MFP record and a first printer driver record; and whereby the addition of either a new driver or a new MFP and automatic association is accomplished without manual administration by a user.

* * * * *